US008545317B2

(12) United States Patent
Mosley et al.

(10) Patent No.: US 8,545,317 B2

(45) Date of Patent: Oct. 1, 2013

(54) GAMING SYSTEM AND METHOD

(75) Inventors: Bob Mosley, Piedmont, SC (US); Troy Jungmann, Austin, TX (US)

(73) Assignee: Gateway Systems, LLC, Piedmont, SC (US)

(*) Notice: Subject to any disclaimer, the term of this patent is extended or adjusted under 35 U.S.C. 154(b) by 0 days.

(21) Appl. No.: 13/617,105

(22) Filed: Sep. 14, 2012

(65) Prior Publication Data

US 2013/0012307 A1 Jan. 10, 2013

Related U.S. Application Data

(63) Continuation-in-part of application No. 13/424,630, filed on Mar. 20, 2012.

(60) Provisional application No. 61/566,653, filed on Dec. 4, 2011.

(51) Int. Cl.

*A63F 13/12* (2006.01)

*A63F 13/00* (2006.01)

(52) U.S. Cl.

USPC .................................. 463/28; 463/25; 463/42

(58) Field of Classification Search

USPC .............................. 463/16, 20, 25, 28, 40–42

See application file for complete search history.

(56) References Cited

U.S. PATENT DOCUMENTS

| | | | | |
|---|---|---|---|---|
| 5,280,909 | A * | 1/1994 | Tracy | 463/27 |
| 5,779,546 | A * | 7/1998 | Meissner et al. | 463/25 |
| 6,110,043 | A * | 8/2000 | Olsen | 463/27 |
| 6,319,125 | B1 * | 11/2001 | Acres | 463/25 |
| 6,345,824 | B1 * | 2/2002 | Selitzky | 273/292 |
| 6,475,088 | B1 * | 11/2002 | Jones et al. | 463/27 |
| 6,780,105 | B1 * | 8/2004 | Kaminkow | 463/16 |
| 6,887,154 | B1 * | 5/2005 | Luciano et al. | 463/26 |
| 6,988,946 | B2 * | 1/2006 | Michaelson et al. | 463/17 |
| 7,169,041 | B2 * | 1/2007 | Tessmer et al. | 463/16 |
| 7,311,598 | B2 * | 12/2007 | Kaminkow et al. | 463/16 |
| 7,419,162 | B2 * | 9/2008 | Lancaster et al. | 273/292 |
| 2003/0104853 | A1 * | 6/2003 | Tessmer et al. | 463/16 |
| 2005/0187014 | A1 * | 8/2005 | Saffari et al. | 463/27 |
| 2005/0239537 | A1 * | 10/2005 | Ogiwara | 463/17 |
| 2006/0121971 | A1 * | 6/2006 | Slomiany et al. | 463/16 |
| 2007/0060247 | A1 * | 3/2007 | Low et al. | 463/16 |
| 2007/0082725 | A1 * | 4/2007 | Low et al. | 463/16 |
| 2008/0207301 | A1 * | 8/2008 | Yokota et al. | 463/17 |
| 2008/0214294 | A1 * | 9/2008 | Yoshizawa | 463/25 |
| 2008/0274783 | A1 * | 11/2008 | Walker et al. | 463/13 |
| 2008/0305856 | A1 * | 12/2008 | Walker et al. | 463/25 |
| 2009/0111572 | A1 * | 4/2009 | Bigelow et al. | 463/21 |

(Continued)

*Primary Examiner* — William M. Brewster

*Assistant Examiner* — Jason Skaarup

(74) *Attorney, Agent, or Firm* — Sutherland Asbill & Brennan LLP

(57) ABSTRACT

A secondary game system, in various embodiments, comprises a system of networked game terminals where a player playing a game on a game terminal can earn eligibility to win a prize from a secondary game that plays simultaneously in the background. The secondary game may be triggered based on play on the plurality of networked terminals. This allows the player to play a first game that earns them eligibility to win another game that is played in the background. The player sends a game initiation request for a game (e.g., lottery slot) to be played on the game terminal. If a certain criterion is satisfied, the player becomes eligible to win a prize from the secondary game if the secondary game is triggered while the player is eligible to win.

22 Claims, 8 Drawing Sheets

(56) References Cited

U.S. PATENT DOCUMENTS

| | | | | |
|---|---|---|---|---|
| 2009/0124371 | A1* | 5/2009 | Gilmore et al. | 463/27 |
| 2009/0137313 | A1* | 5/2009 | Young | 463/31 |
| 2009/0239622 | A1* | 9/2009 | Fujimori et al. | 463/20 |
| 2010/0062820 | A1* | 3/2010 | Yoshizawa | 463/11 |
| 2010/0120494 | A1* | 5/2010 | DeWaal et al. | 463/20 |
| 2010/0124988 | A1* | 5/2010 | Amos et al. | 463/27 |
| 2010/0285860 | A1* | 11/2010 | Svanas | 463/20 |
| 2012/0034968 | A1* | 2/2012 | Watkins et al. | 463/20 |
| 2012/0077569 | A1* | 3/2012 | Watkins et al. | 463/25 |
| 2012/0077579 | A1* | 3/2012 | Apirian et al. | 463/29 |
| 2012/0077587 | A1* | 3/2012 | Apirian et al. | 463/31 |
| 2012/0077588 | A1* | 3/2012 | Apirian et al. | 463/31 |

* cited by examiner

FIG. 6E
WINNER!!!
CONGRATULATIONS
328
PRIZE WON
$4000.34
320
190

GAMING SYSTEM AND METHOD

CROSS-REFERENCE TO RELATED APPLICATIONS

This application is a continuation-in-part of U.S. patent application Ser. No. 13/424,630, filed Mar. 20, 2012, entitled "Gaming System and Method", which is incorporated herein by reference in its entirety, which claims benefit of priority under 35 U.S.C. §119(e) to the filing date of U.S. Provisional Application No. 61/566,653, as filed on Dec. 4, 2011, which is incorporated herein by reference in its entirety.

BACKGROUND

Sweepstakes games exist that allow a player to reveal a prize associated with the sweepstakes entry ticket. Electronic sweepstakes games operate to allow a player to reveal the results of a ticket through the use of a visually pleasing display on a computer or other gaming terminal. However, electronic sweepstakes games do not always keep the player engaged. The present system and methods recognize and address the foregoing considerations, and others, of prior art system and methods.

SUMMARY OF THE INVENTION

A computer-implemented method of allowing a user to play an electronic game on a terminal, in various embodiments, comprises: (1) receiving a request from a player to play a game at a terminal; (2) at least partially in response to receiving the request, facilitating a play of the game at the terminal; (3) at least partially in response to receiving the request from the player, establishing a bonus time period for the player; (4) receiving an indication that play of a second game occurs at a particular point in time; (5) determining if the bonus time period runs coincident with the particular point in time; (6) determining whether play of the second game results in a prize; and (7) if play of the second game results in a prize and the bonus time period runs coincident with the particular point in time, awarding at least a portion of the prize to the player.

In some embodiments, the method further comprises at least partially in response to receiving the request from the player, triggering play of the second game. In other embodiments, the method further comprises at least partially in response to triggering play of the second game, capturing an image of a display associated with a player if the bonus time period for the player runs coincident with the particular point in time, and storing the image on the terminal. In yet other embodiments, the method further comprises notifying the player of the award of the at least a portion of the prize. In yet other embodiments, the method further comprises decrementing the bonus time period for the player. In some embodiments, the method further comprises incrementing the bonus time period for the player when additional requests are received from the player to play the game at the terminal.

In still other embodiments, the method further comprises receiving requests from a plurality of players to play a game. In these embodiments, the method further comprises at least partially in response to receiving the requests from the plurality of players, establishing a bonus time period for at least one or more of the plurality of players. In some of these embodiments, the method further comprises determining if the bonus time periods associated with the one or more of the plurality of players runs coincident with the particular point in time. In these embodiments, the method further comprises awarding at least a portion of the prize to each of the one or more of the plurality of players who have a bonus time period that runs coincident with the particular point in time.

A computer-implemented method of playing a game, in various embodiments, comprises: (1) receiving, from a plurality of players, a plurality of requests to play a game; (2) at least partially in response to receiving the plurality of requests to play the game, facilitating play of the game for each of the plurality of players making a request; (3) at least partially in response to receiving the plurality of requests, awarding a bonus time period to each one of the plurality of players if the request for each of the plurality of players satisfies accordance with a first criterion; (4) receiving an indication that a play of a second game occurs at a particular point in time; (5) determining, for each one of the plurality of players awarded the bonus time period, whether the bonus time period for the each one of the plurality of players is operative concurrent with the particular point in time; and (6) awarding at least a portion of a prize that results from play of the second game to at least one of the each one of the plurality of players awarded the bonus time period that is operative concurrent with the particular point in time.

A computer system for playing games, in various embodiments, comprises at least one processor, and a plurality of terminals operatively coupled to the at least one processor. The at least one processor is configured to: (1) receive a request from at least one player to play a game on one of the plurality of terminals; (2) at least partially in response to receiving the request from the at least one player, facilitate a play of the game on the one of the plurality of terminals; (3) at least partially in response to the request from the at least one player, establish a bonus time period for the at least one player; (3) receive an indication that a play of a secondary game has occurred at a particular point in time, and that the play of the secondary game has results in a prize; (4) determine whether the play of the secondary game occurs during the bonus time period for the at least one player; and (5) at least partially in response to determining that the play of the secondary game has occurred during the bonus time period for the at least one player, award at least a portion of the prize to the at least one player.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

DESCRIPTION OF SOME EMBODIMENTS

Figure 1:
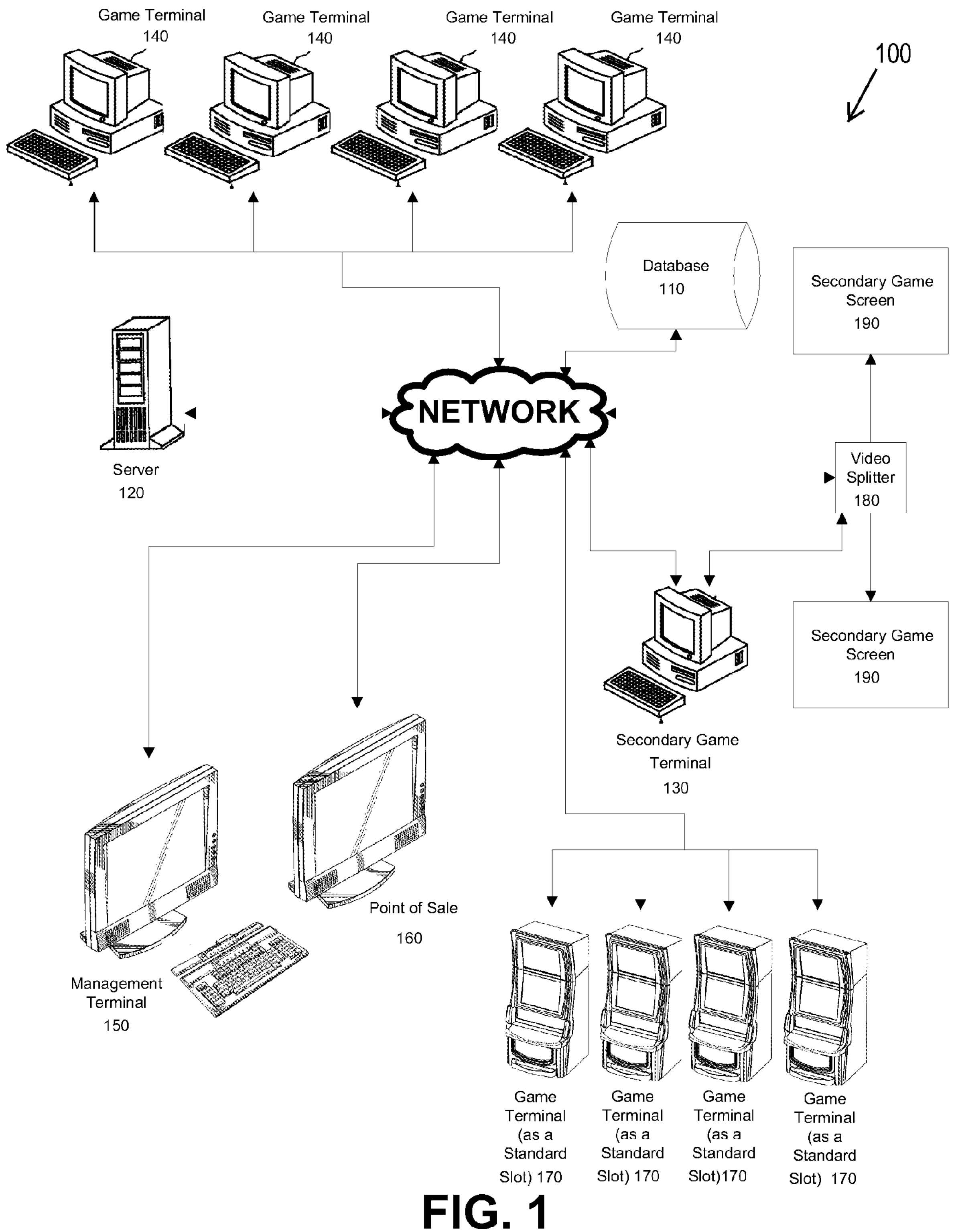
FIG. 1 is block diagram of an exemplary floor configuration in accordance with an embodiment of the present system.

Embodiments of the present system support games structured for all game styles known in the art. In some embodiments, the present games and methods can be used in connection with any Class II and III games. In yet another embodiment, the present games and methods can be used in connection with Class III random number generated (RNG) games, Class III electronic pull tab games, electronic bingo games, lottery-based games, and sweepstakes games. Embodiments of the invention are agnostic to the methods in which the results are delivered.

Overview

Gaming terminals may be standalone type terminals or networked terminals. In either case, a secondary game, as the term is used herein, is a game that is common to all players on a group of gaming terminals and may be played simultaneously in the background. This configuration allows the players on the individual gaming terminals to play a first game that earns them eligibility to potentially win the secondary game that is played in the background, which provides an enjoyable experience for the player and encourages them to continue to play on the gaming terminal.

The secondary game of the present system may be considered a game-in-game. In this regard, according to an embodiment of the system, the secondary game is a game that is linked with a plurality of other game terminals such that play on the plurality of game terminals triggers play of the secondary game. Moreover, a prize from the secondary game is awarded to one or more of the players of the plurality of game terminals based on their eligibility to participate in the winnings of the secondary game play. As a result, the players of the plurality of game terminals may be eligible to win all or a portion of a secondary prize in addition to individual prizes awarded on their respective game terminal.

In one embodiment of the present system, the player may purchase internet time or another product or service, and when this occurs, the player may be issued free entries into a sweepstakes. In some embodiments, the player is issued participation credits that can be redeemed for sweepstakes entries. In either case, the sweepstakes entries may be revealed through an entertaining electronic display that is accessed on one of the plurality of game terminals. In an embodiment, a particular amount of participation credit is redeemed for a sweepstakes ticket, which is revealed through the standard game and a particular amount of participation credit earns the player eligibility time to reveal a sweepstakes ticket as part of the secondary game.

In some embodiments, the player may pay a fee to play the standard game and an additional fee to be eligible to win the secondary game. For example, a player pays a first fee, such as $0.25, to play the standard game, and at the same time pays an additional contribution fee, such as $0.02, to win a prize from the secondary game if the player is eligible to win when the secondary game is played. Thus, players each pay $0.27 to play the standard game, which also enters the player into the secondary game (and thus, makes the player eligible for the secondary winnings round). More detailed descriptions of a system and method of gaming are provided below according to various embodiments.

Exemplary Gaming System

FIG. 1 illustrates a system 100 for providing a secondary game in accordance with an embodiment of the present invention. The system 100 comprises a database 110, a server 120, at least one secondary game terminal 130, one or more game terminals (that may be PC-based) 140, a management terminal 150, a point-of-sale ("POS") device 160, one or more standalone game terminals (that may be any gaming based machine) 170, a video splitter 180, a relatively large monitor or television (secondary screen) 190, or any combination thereof. Those skilled in the art with reference to this disclosure should appreciate that other configurations may be used to accomplish the methods described herein without departing from the scope of the present invention. For example, in various embodiments, the game server 120 may be configured to also provide the functionality provide by the secondary game server 130.

It should be understood that each of the computing devices, including the server 120, the at least one secondary terminal 130, the one or more game terminals 140, the management terminal 150, the POS device 160, and the one or more standalone game terminals 170, may each have a computer hardware processor, input and output devices (for example, a computer monitor, a keyboard, selection buttons, and/or mouse) and at least one storage device (for example, memory, hard drives, etc.). These devices may also have network connection cards to connect to the network. At least some of these devices may also include a computer readable medium, which is further described herein.

The secondary game may run asynchronously with an integrated gaming system or as a linked product via SAS to other gaming terminals, in certain embodiments, the secondary game is not intended to be a standalone gaming platform because it is initiated based upon play of the standard game on each gaming terminal connected to the gaming system 100. There are specific integration points between the game server, gaming terminals, and the secondary game server that allows one or more players to participate in playing a game at a terminal while earning eligibility to win on a secondary game.

The server 120 is configured to communicate data from various devices in the system and to perform one or more method steps, as detailed below. The database 110 may contain various types of data and computer instructions for performing at least some of the steps presented herein. Although a single server is indicated for the server 120, and a single database for the database 110, it should be understood that the network may be comprised of multiple servers and databases, whether located locally and networked through a local area network or remotely through a wide area network or an Internet connection. Thus, the single representations at 120 and 110 are provided for purposes of illustration and clarity only and should be understood to represent such other configurations.

The gaming terminals 140 and 170 are illustrated as linked together via a network (which may be via the network shown in FIG. 1 or any additional network). Each gaming terminal may be a standard standalone gaming machine 170, a personal computer (PC) 140 or other computing device (not shown). The gaming terminals 140 and 170 are illustrated in FIG. 1 as separate groups (even though they function similarly and perform the same method steps).

The POS device 160 allows players to buy internet time or another product or service, and play of the gaming terminals could be free with such purchases. In various embodiments, the player may use the POS device 160 to directly load an account card with credits to play games on the gaming terminals. This account card is associated with an account that the player may use to play the game on a game terminal 140, 170 and earn eligibility to win prizes when the secondary game is triggered.

The management terminal 150 may be a device that is operatively connected with the server 120 to initiate, enable, disable or change the secondary game. Other managerial or supervisory operations may also be performed using the management terminal 160.

The secondary terminal 130 controls one or more operations of the secondary game, such as determining results for the secondary game, displaying the secondary game results, and/or any other operations as discussed herein. In some embodiments, the secondary terminal 130 is part of the server 120 such that the server 120 performs all or part of the operations of the secondary terminal 130.

A video splitter 180 may be operatively connected to the secondary terminal 130 and/or the network. The video splitter may be used to split any received video feed to multiple secondary screens 190. The secondary screens 190 may be television screens, monitors or other device that displays the secondary game board and other procedures of the secondary game.

One or more of the devices illustrated in FIG. 1 may be connected to a network as previously mentioned. In one embodiment, all devices in FIG. 1 are connected to the network and communicate with each other over the network. It should be noted that the network in FIG. 1 need not be a single network (such as only the internet) and may be multiple networks (whether connected to each other or not). For example, the network may be the internet. In another embodiment, the network may be a local area network ("LAN") and a wide area network ("WAN") (e.g., the Internet) such that one or more devices (for example, server 120, secondary terminal 130, management terminal 150 and database 110) are connected together via the LAN, and the LAN is connected to the WAN which in turn is connected to other devices (for example, the game terminals 140, 170). The terms "linked together" or "connected together" refers to devices having a common network connection via a network (either directly on a network or indirectly through multiple networks), such as one or more devices on the same LAN, WAN or some network combination thereof.

It should be understood that FIG. 1 is an exemplary embodiment of the present system and various other configurations are within the scope of the present system. Additionally, it should be understood that additional devices may be included in the system shown in FIG. 1, or in other embodiments, certain devices may perform the operation of other devices shown in the figure.

Exemplary Technical Platforms

As will be appreciated by one skilled in the relevant field, the present systems and methods may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary Gaming Methods

Figure 2:
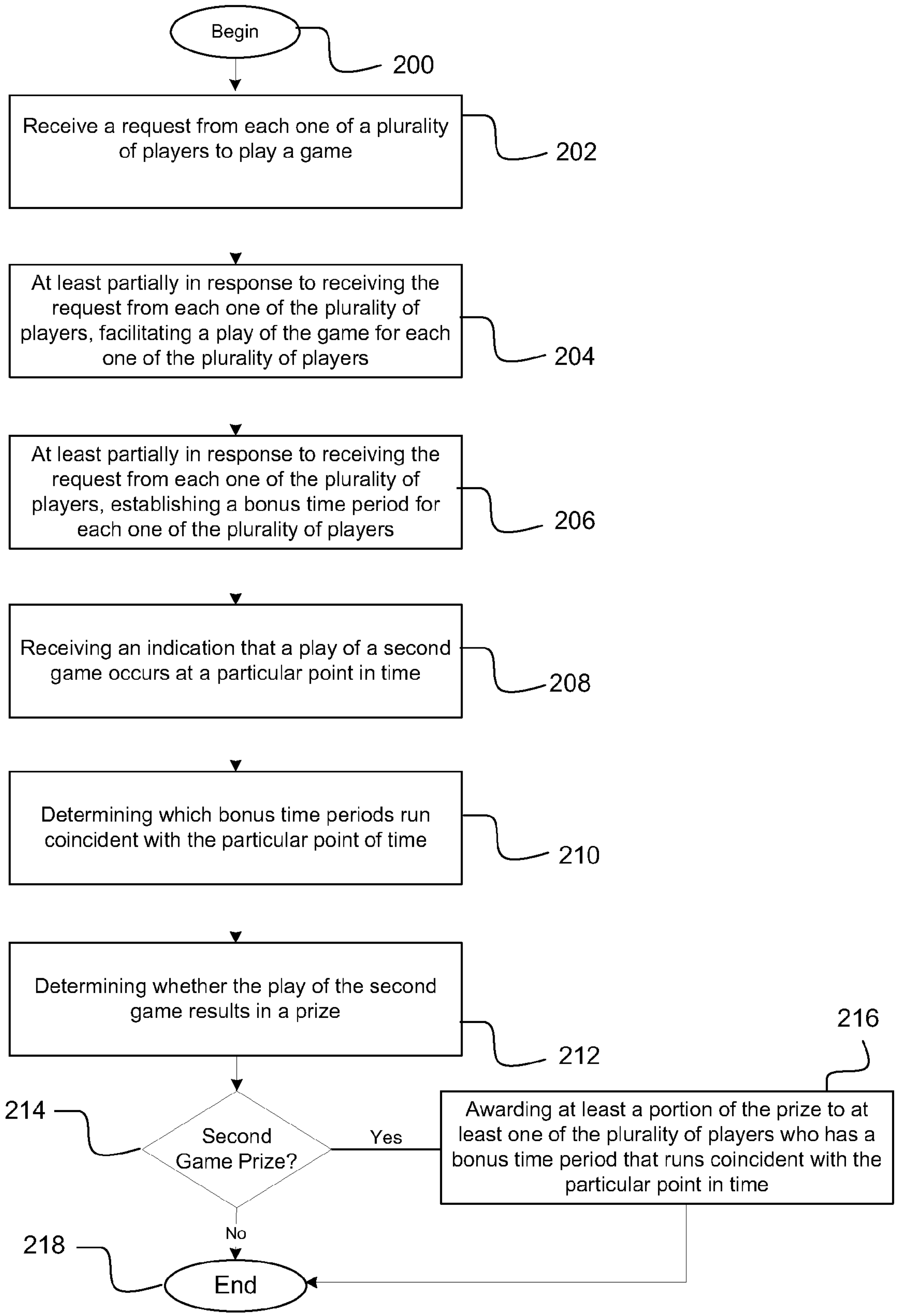
FIG. 2 comprises a flow diagram illustrating an exemplary process performed by the system of FIG. 1 in accordance with an embodiment of the present method.
Figure 3:
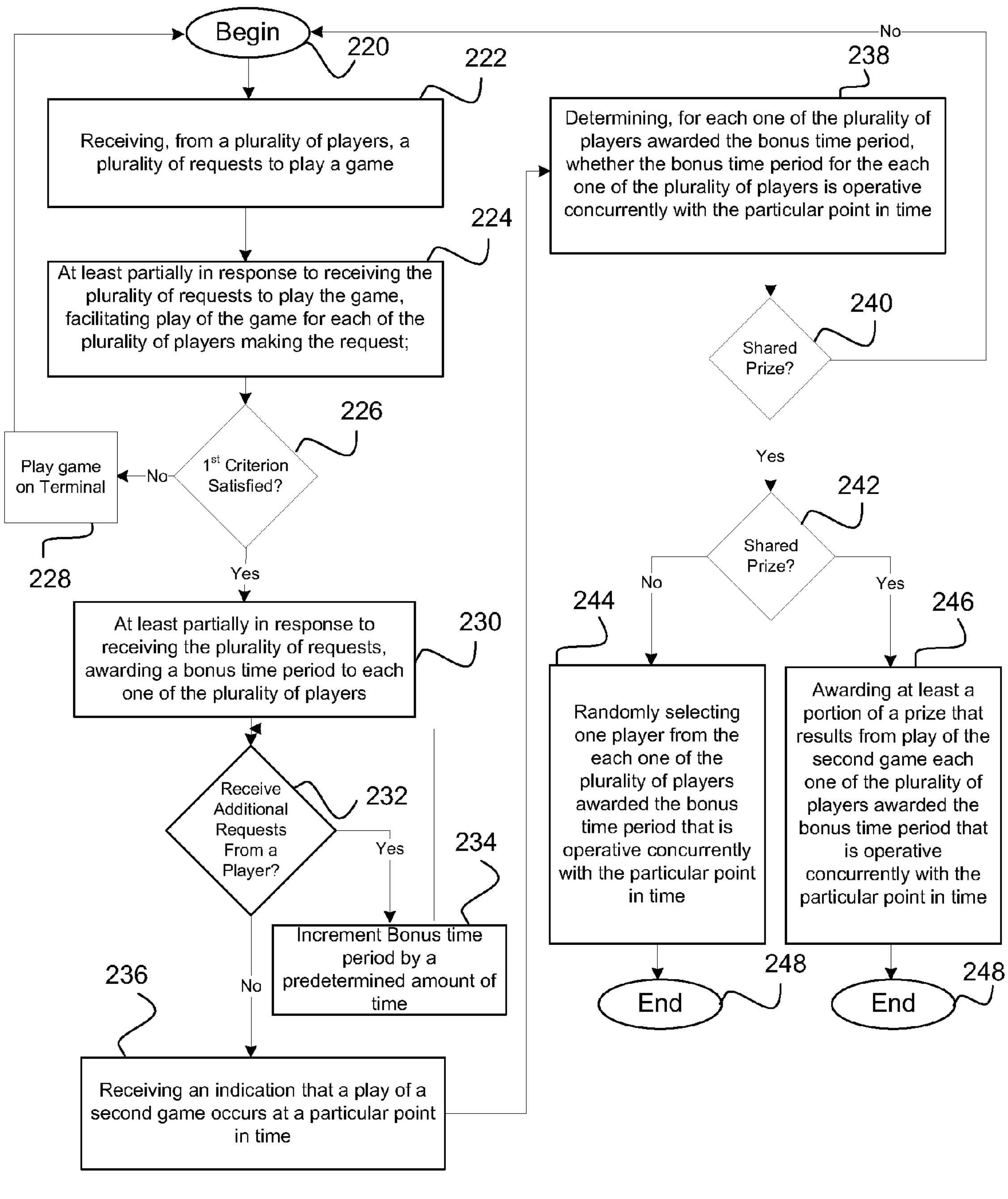
FIG. 3 comprises a flow diagram illustrating an exemplary process performed by the system of FIG. 1 in accordance with an embodiment of the present method.
Figure 4:
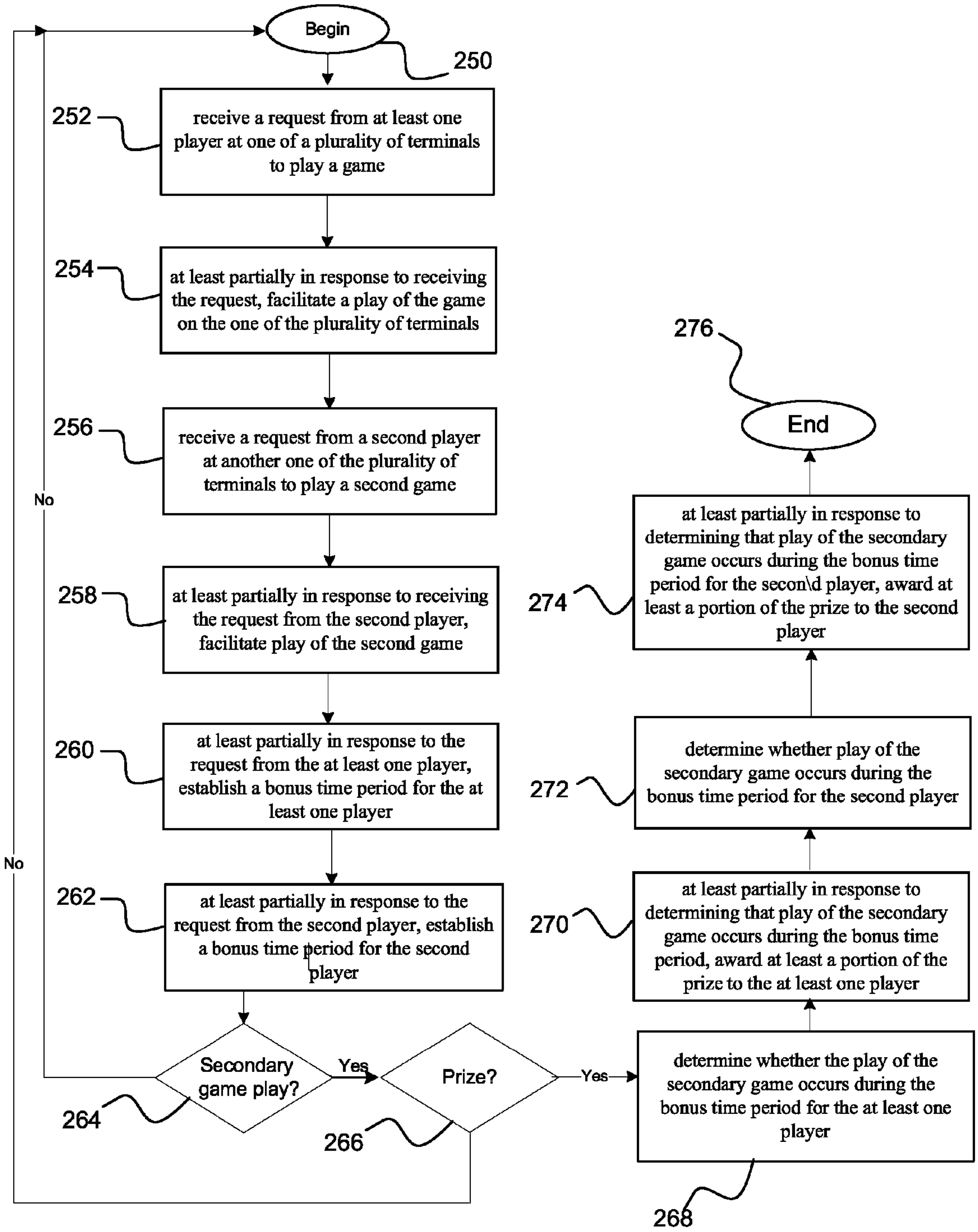
FIG. 4 comprises a flow diagram illustrating an exemplary process performed by the system of FIG. 1 in accordance with an embodiment of the present method.

The gaming terminals 140, 170, server 120, and secondary server 130 may alone, or in combination, perform the method steps of FIGS. 2-4. Moreover, the method steps described in FIGS. 2-4 are examples of various embodiments of the present system and methods. It should be understood by reference to this disclosure that these methods describe exemplary embodiments of the methods steps carried out by the present system, and that other exemplary embodiments may be created by adding other steps or by removing one or more of the methods steps described in FIGS. 2-4.

FIG. 2 depicts an exemplary method for playing a game on a terminal 140, 170 to become eligible to win a prize from the play of a secondary game that begins at step 200 when, for example, one or more players press or activate a spin or reveal button 306 (FIG. 5) on the gaming terminals 140, 170. At step 202, the system 100 receives a request from a player to play a game, for example, at a gaming terminal 140, 170. At least partially in response to receiving the request, at step 204, the system 100 facilitates play of the game at the game terminal. At step 206, the system 100 establishes a bonus time period for the player.

In various embodiments, a bonus time period is established if a player initiates a game play during a defined period of time. In some embodiments, the system 100 displays a countdown timer 302 (FIG. 5) that provides the player an indication of the time remaining for the player to spin to become eligible to earn a bonus time period. In still other embodiments, a second visual indicator 304 displays a particular color (such as green) when the countdown timer has a first amount of time remaining, turns a different color (such as yellow) when the countdown timer has a second amount of time remaining that is less than the first amount of time, and turns another color (such as red) when no time remains to earn a bonus time period.

In some embodiments, the bonus time period may be a predetermined amount of time, for example, fifteen seconds of eligibility. Thus, from the time of the spin (e.g., request to play the game at the terminal 140, 170), the player remains eligible to participate in the secondary game until the bonus time period decrements to zero. In various other embodiments, the bonus time period may be five seconds of eligibility time, and the eligibility time may accumulate each time the player submits a request to play the game at terminal 140, 170. In some of these embodiments, the player may accumulate an unlimited amount of time by submitting additional requests to play the game at terminal 140, 170, in five second increments. In other embodiments, the system 100 may cap the accumulated time of eligibility to participate in the secondary game to a predetermined upper limit (e.g., twenty-five seconds). In all of these embodiments, the bonus time period decrements in one second increments whether the bonus time period is a fixed amount or accumulates as the player continues to play the game.

At step 208, the system 100 receives an indication that play of a second game occurs at a particular point in time. At step 210, the system 100 determines if the bonus time period for the player runs coincident with the particular point in time. The second game can be triggered to play using any suitable means. For example, in various embodiments, play of the second game may be partially in response to receiving the request to play the game at terminal 140, 170 by the player. Thus, in these embodiments, secondary server 130 may assign a random number of spins as a trigger for play of the secondary game, and the system 100 decrements a counter for each request that is received to play a game at terminals 140, 170. Once the counter reaches zero, play of the secondary game is triggered. In some embodiments, the random number of spins may be selected between a predetermined minimum and maximum number. In this way, play of the secondary game occurs at random times based on the random number of spins selected as the trigger, and the volume of play that occurs at game terminals 140, 170.

At step 212, the system 100 determines whether play of the secondary game results in a prize. If no prize is awarded, the method of play ends at step 218. Otherwise, if the bonus time period for the player runs coincident with the particular point in time, then the system 100 awards at least a portion of the prize to the player. In some embodiments, the prize may be a shared prize where a portion of the prize is awarded to other players who had a bonus time period that runs coincident with the particular point in time. In still other embodiments, if the prize is not a shared prize, the system 100 may randomly choose one player from a plurality of players that have a bonus time period that runs coincident with the particular point in time and award the prize to that player.

The method of play ends at step 218. In various embodiments, if the sweepstakes game has not terminated (e.g., the fixed number of sweepstakes draws is not depleted by play of the secondary game), the method restarts at step 200 and continues until the sweepstakes game is completes.

FIG. 3 depicts another embodiment of a method of playing a game at a game terminal 140, 170 that may earn the player the ability to win an additional secondary game that begins at step 220. For example, the game may begin when one or more players press or activate the spin or reveal button 306 (FIG. 5) on the gaming terminals 140, 170. At step 222, the system 100 receives, from a plurality of players on the terminals 140, 170 a plurality of requests to play a game on the individual terminals. At step 224, at least partially in response to receiving the plurality of requests to play the game, the system 100 facilitates play of the game for each of the plurality of players making the request.

At step 226, the system 100 checks to see if each request satisfies a first criterion. In various embodiments, the first criterion may be submitting a request to play the game within a predetermined time period. For example, the system 100 may require that the request to play a game on one of the terminals 140, 170 be submitted before the countdown timer 302 decrements to zero. If a submitted request does not satisfy the first criterion, then the player making the request will not be eligible to participate in the secondary game, and can only play the game on the terminal 140, 170. Once the play of the game ends, the method for that player restarts at step 220. If, on the other hand, the request satisfies the first criterion, then at least partially in response to receiving the plurality of requests, at step 230, the system 100 awards a bonus time period to each of the plurality of players whose request satisfies the first criterion.

In some embodiments, at step 232, the system 100 determines whether each of the plurality of players who were awarded a bonus time period submits additional requests to play the game on terminals 140, 170. If additional requests are made by one or more of the plurality of players, at step 234, the system 100 increments the bonus time period for each of those players by a predetermined amount of time. In still other embodiments, instead of incrementing the bonus time period for a player making an additional request, the system 100 may reset the bonus time period for that player to a predetermined amount of time each time that player submits an additional request to play the game on terminal 140, 170.

At step 236, the system 100 receives an indication that play of the secondary game occurs at a particular point in time. The system 100 may trigger play of the secondary game based on one or more factors. For example, in various embodiments, the system 100 may trigger play of the secondary game based on the number of requests received in step 222 that results in the award of a bonus time period in step 230. In other embodiments, play of the secondary game may be triggered at a particular time. For example, the system 100 may trigger play of the secondary game at a randomly selected time interval. In still other embodiments, play of the secondary game may be triggered based on the requests made to play a game at each of the game terminals 140, 170 regardless of whether the request results in earning a bonus time period for the player making the request.

At step 238, the system 100 determines, for each of the plurality of players awarded the bonus time period, whether the bonus time period for each of those players was operative concurrent with the particular point in time when play of the second game occurs. In various embodiments, the system 100 captures and records information regarding those players who have a bonus time period that is operative concurrent with the particular point in time, and displays an indicator on the player's respective terminal to notify the player that the play of the second game is occurring and that the player is eligible to participate. For example, an indicator may be displayed on a terminal display 300 (FIG. 5) that indicates that the secondary game is triggered and that the player is eligible to win a prize on the secondary game. In various embodiments, the system 100 may display several indicators on the gaming terminals 140, 170, such as a blinking border around the display 300 (FIG. 5) and a display element in the form of a lock to indicate that the player is eligible to win the second game (e.g., the secondary game). In still other embodiments, the game server 120 records information regarding each player who has a bonus time period operative concurrent with the point in time in database 110 so that the system can award the prize to players.

At step 240, the system 100 determines if a prize results from play of the second game and, if a prize does result, at step 242, the system 100 determines whether the prize is a shared prize or an individual prize. At step 244, if the prize is an individual prize, then in various embodiments, the system 100 randomly selects one player from the plurality of players that have a bonus time period that is operative concurrent with the particular point in time and awards the prize to that player. If, on the other hand, the prize is a shared prize, at step 246, the system 100 awards at least a portion of the prize that results from play of the second game to each one of the plurality of players that have a bonus time period that is operative concurrent with the particular point in time. The method ends at step 248, and if the sweepstakes associated with the secondary game is not complete, the method restarts at step 220.

FIG. 4, illustrates yet another embodiment of a method of playing a game on a plurality of networked terminals 140, 170 to earn eligibility to win a prize from play of a game (e.g., a secondary game that is common to all of the game terminals). The method begins at step 250 when the system 100 receives a request from at least one player on the one terminal 140, 170. At least partially in response to receiving the request from the at least one player, at step 254, the system 100 facilitates play of the game. At step 256, the system 100 receives a request from a second player to play a second game on another terminal 140, 170. At least partially in response to the second request, at step 258, the system 100 facilitates play of the second game. At step 260, at least partially in response to the request from the at least one player, the system 100 establishes a bonus time period for the at least one player. At step 262, at least partially in response to the request from the second player, the system 100 establishes a bonus time period for the second player.

At step 264, the system 100 receives an indication that play of a secondary game occurs at a particular point in time. The system, at step 266, also determines if play of the secondary game results in a prize. At step 268, if play of the secondary game results in a prize, the system determines whether play of the secondary game occurs during the bonus time period for the at least one player. If play of the secondary game occurs during the bonus time period for the at least one player, then at step 270, at least partially in response to determining that play of the secondary game occurs during the bonus time period for the at least one player, the system 100 awards at least a portion of the prize to the at least one player. In various embodiments, the system 100, at step 272, determines whether play of the secondary game occurs during the bonus time period for the second player. At step 274, if the system determines that play of the secondary game occurs during the bonus time period for the second player, then at least partially in response to determining that play of the secondary game occurs during the bonus time period for the second player, the system 100 awards at least a portion of the prize to the second player.

In various embodiments, the number of spins that must occur at the plurality of terminals 140, 170 to trigger play of the secondary game is determined by a random number that is selected within a defined range. The defined range may consist of a minimum spin and a maximum spin count. Thus, in these embodiments, the frequency of play of the secondary game is based on the number of players playing on the plurality of terminals 140, 170 and the frequency that each player spins.

In various embodiments, the secondary game configuration can be changed. For example, changes may include a change to: (1) the date of the promotion, (2) the maximum and minimum spin speeds for the secondary game, (3) the secondary accumulators, (4) the contribution values or fees that each player pays to become eligible to win the secondary game, (5) the base values of any of the secondarys or (6) any other change in the secondary game. In various embodiments where changes are made to the fee to earn eligibility for the secondary game, the game terminals 140, 170 cache information regarding the change and may make graphical adjustments to the information displayed to the players.

Exemplary User Experience

The operation of exemplary embodiments of the standard game and the secondary game are perhaps best understood by reviewing particular examples. The following examples describe the experience of the player while playing the standard game and the secondary game. In the examples described herein, the game on terminal 140, 170 and the secondary game are sweepstakes games. However, it should be understood that the methods and systems described herein also apply to other types of games such as Class III standalone game terminals.

User Experience at a Game Terminal

Figure 5:
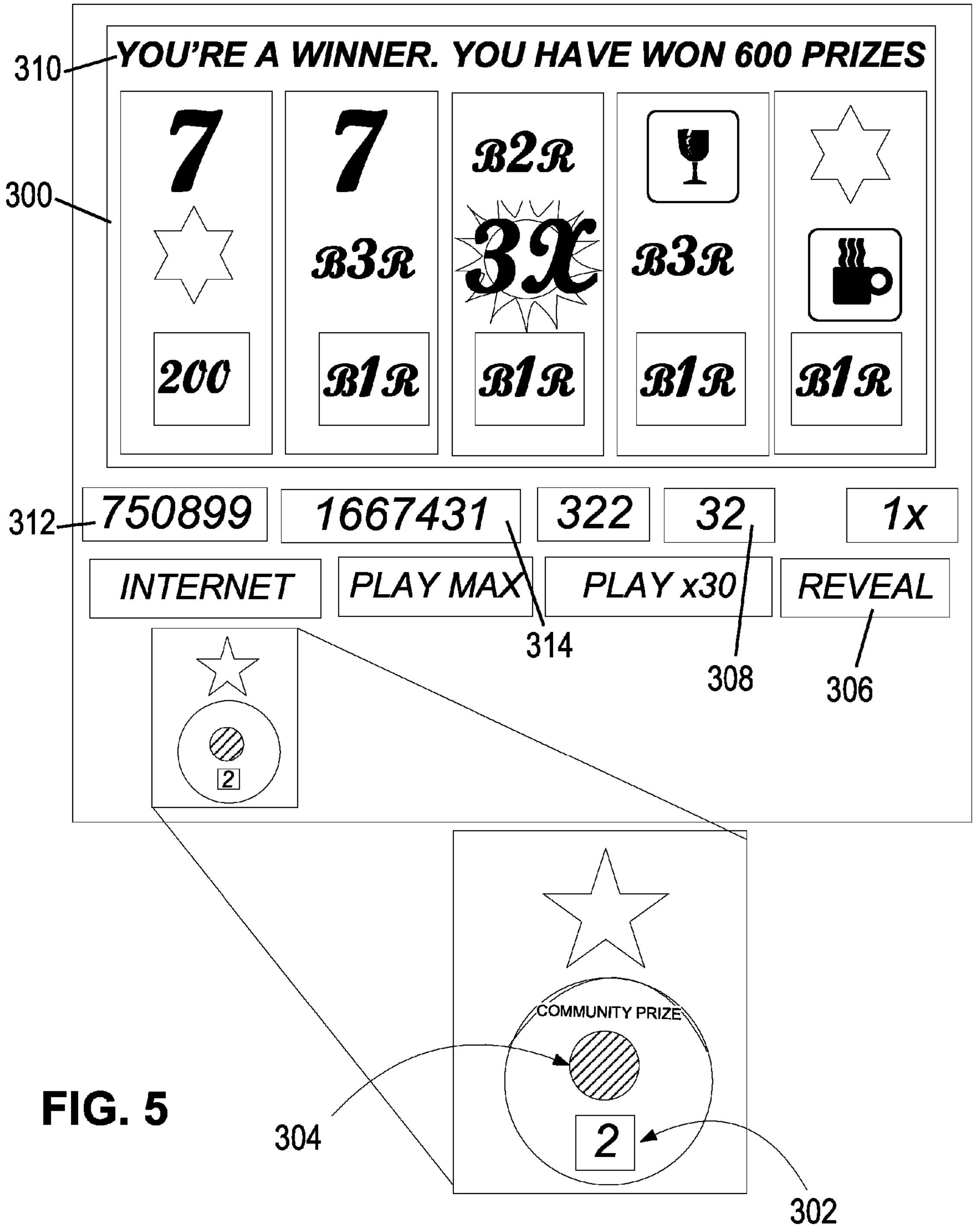
FIG. 5 comprises the contents of a graphical user interface in accordance with one embodiment of the present system and methods.

Referring to FIG. 5, a player logs into a game terminal 140, 170 by entering a pin number, swiping a player magnetically-encoded card, inserting cash to a bill acceptor on a standalone game terminal or by any other suitable method to activate or associate some account or player with the game terminal 140, 170. The game terminals 140, 170 access database 110 to determine if there are any credits or fees required to play the game, and if so, displays the fees at 308. The player manually initiates the standard game by activating the appropriate button (e.g., the "Reveal" button or other button) 306. The initiation request (including any participation credits or contribution fees) is transmitted to game server 120 for processing. If required, the fees or credits are transferred from the account of the player (whether the account is a cash account on the game terminal or an account associated with the user's entered card) to the game server 120 in order to play the game.

As discussed above, the player must maintain at least one spin within the preconfigured eligibility timer 302 or they will become ineligible for the secondary game. Also, in various embodiments, the player may accumulate eligibility time for the secondary game with each spin of the game at terminal 140, 170. In various embodiments, each time the player initiates game play on terminal 140, 170, the system automatically resets the eligibility timer 302 and initiates a new count down from a predetermined time.

If the player does not hit the reveal button before the eligibility timer 302 "times out," the player will be ineligible to win the secondary game if the secondary game triggers before the player once again becomes eligible to win the secondary game. The player's ineligibility status is saved at the game server 120, and the game terminal 140 notifies the player of ineligibility by placing "ineligible" at the top of the display screen 300. Ineligible players cannot win a prize from the secondary game if the secondary game triggers while they are ineligible, but they can still play the game on the game terminal 140, 170.

When the player presses the reveal button 306, the game terminal 140, 170 send the request to the game server 120, the game server pulls a play from a fixed number of electronic sweepstakes tickets and returns a result of the ticket to the game terminal 140, 170. The game terminal 140, 170 evaluates the received result and initiates a reel spin to display a combination of symbols on screen 300 that corresponds to the result received from the game server 120. In various embodiments, one or more symbol combinations for each prize result is stored in the database 110, or in local memory in terminals 140, 170, and the game terminal 140, 170: (1) retrieves a symbol combination for the prize, (2) assigns a symbol to each respective reel and (3) stops the reels from left to right, one at a time, until one symbol is displayed for each of the reels.

In various embodiments, multiple combinations of reel positions are assigned to each prize level. Thus, the game terminal 140, 170 may randomly choose from among the multiple combinations of reel positions for any one prize level to present the player with varying displays for each prize. In this way, the display associated with any one prize level changes from play to play to make game play more interesting to the player. The system 100 provides an indication 310 of the winnings for the current spin and increments the user's sweepstakes points 312 by the awarded prize. The display 300 may also include a "total prizes" counter 314 that provides the player with an indication of the total prizes won by that player. Play continues in response to additional requests until all of the tickets for the sweepstakes have been depleted. Once the sweepstakes ends, a new sweepstakes begins.

User Experience for the Secondary Game

Figure 6A:
FIG. 6A-6E comprise the contents of a graphical user interface for a secondary game in accordance with one embodiment of the present system and methods.
Figure 6B:
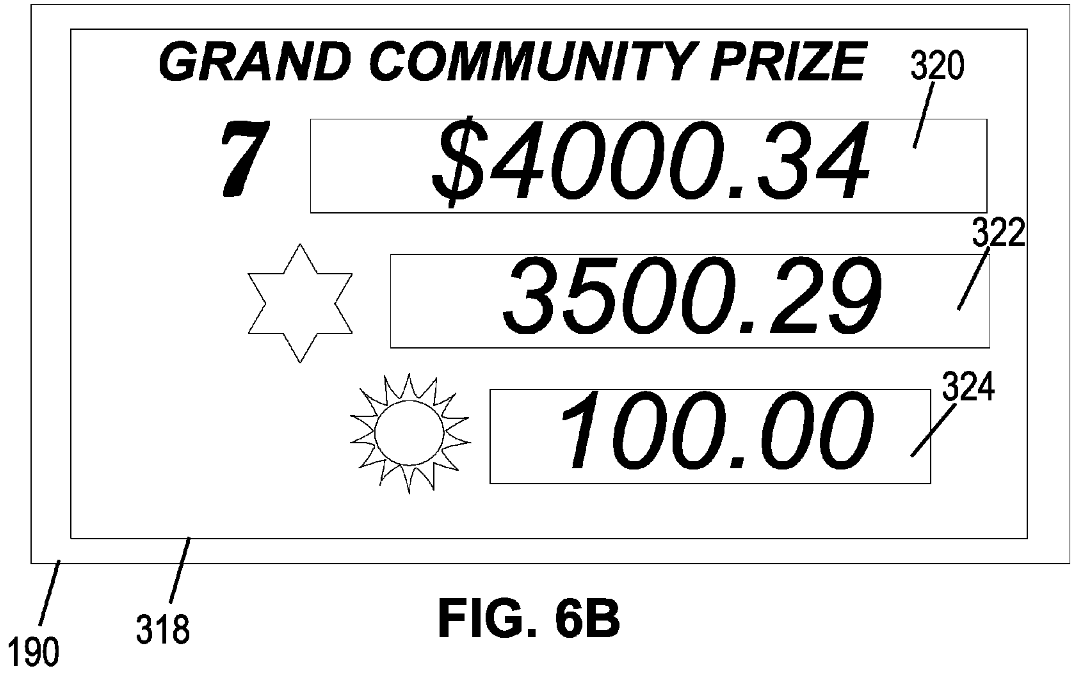

Referring to FIG. 6A, the secondary game display 190 is shown displaying an attract message 316 that the players will see when they enter the gaming area. The attract message can be used to indicate to potential players that the game terminals 140, 170 are part of a secondary game system. Referring to FIG. 6B, the secondary display 190 is shown displaying prize structure 318 for the secondary game. In various embodiments, the secondary game may have a prize structure that includes a top level shared prize 320, an intermediate level shared prize 322 and a low level individual prize 324. It should also be understood from reference to this disclosure that the number of prize levels for the secondary game can vary. Thus, in some embodiments, the secondary game may have four prize levels—a top level shared prize, a top level intermediate shared prize, a low level intermediate individual prize and a low level individual prize.

The top level prize 320 and the intermediate level prize 322 may start at predetermined level and increase as players play games on the individual game terminals 140, 170. Thus, a portion of the fee or points that is paid by the players to be eligible to win the secondary game is added to the top and intermediate level prizes thereby increasing these prize levels over time.

Figure 6C:
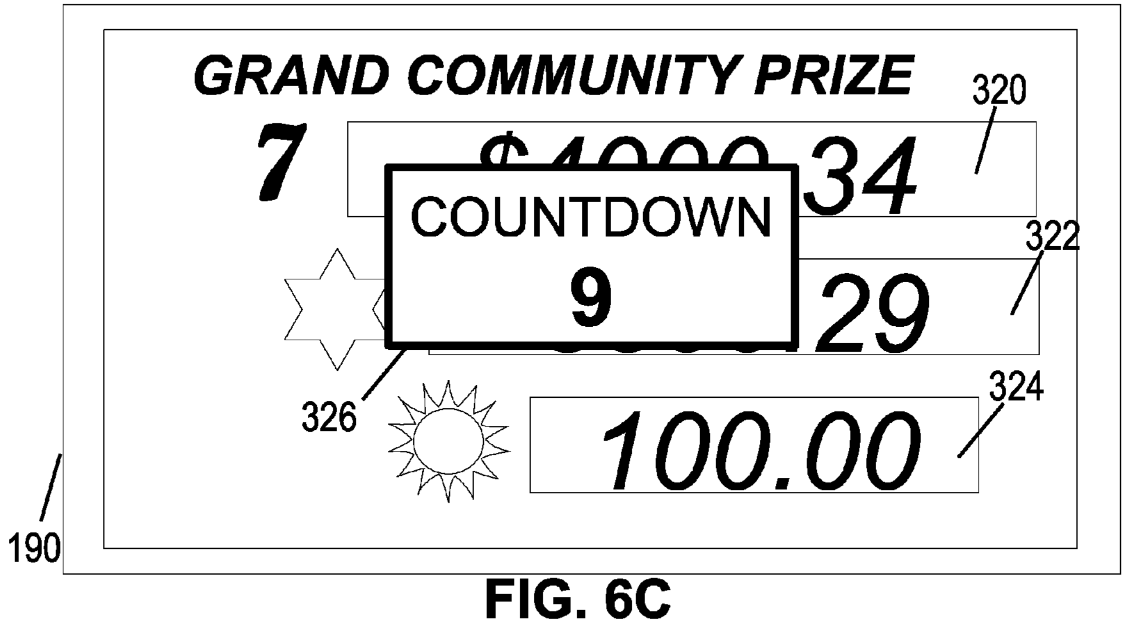

Referring to FIG. 6C, the secondary display 190 is shown displaying a notice 326 that indicates to all of the players that play of the secondary game has been triggered. In various embodiments, the notice is a countdown timer that indicates the number of seconds until the reels on the secondary display is spun to display the results. Once play of the secondary game is triggered, the secondary game server selects an electronic ticket from a fixed number of electronic tickets associated with the sweepstakes game for the secondary game. Based on the selected electronic ticket, the secondary game server 130 determines the result associated with the electronic ticket and the corresponding symbols associated with the result. In various embodiments, the secondary game server 130 follows a similar procedure as the game terminals 140, 170 in choosing the reel display that corresponds to the result. In particular, game server 130 may select one combination of symbols from a plurality of symbol combinations available for any given result. The various symbol combinations may be stored locally on secondary game server 130 or in database 110.

Figure 6D:
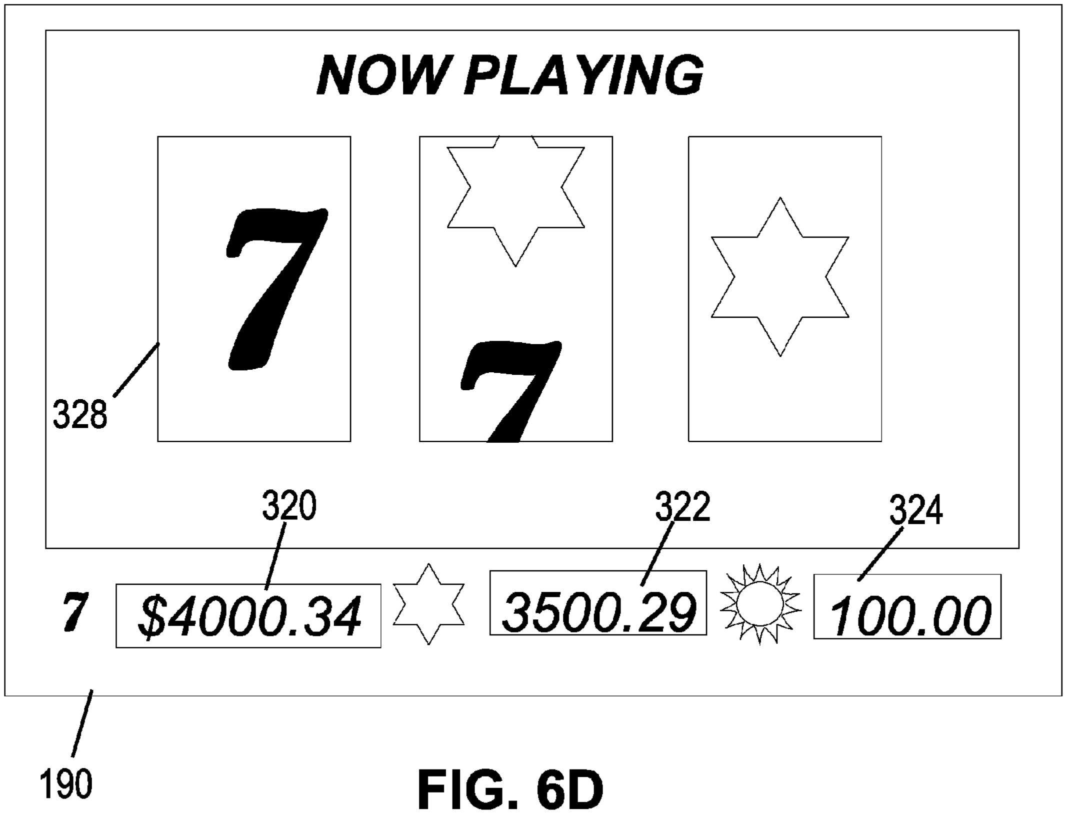

FIG. 6D illustrates the secondary game reels 328 as they spin. The potential prize amounts 320, 322 and 324 are also displayed under the reels 328. As indicated above, play of the secondary game, in various embodiments, is triggered based on the players' request to play games on terminals 140, 170. Actual play of the secondary game is carried out by secondary game server 130, and the results are displayed on the secondary game display 190, which is viewable by all participants.

Figure 6E:

Referring to FIG. 6E, the reels 328 stop in accordance with the selected symbols that are associated with the prize result. In the example shown, the resultant prize is the top level shared prize 320. As a result, the reels 328 display three 7's and a "congratulations" message to indicate that play of the secondary game resulted in a prize. In the case of the top level shared prize, the prize amount is split evenly among all players on game terminals 140, 170 that were eligible to win the secondary game when the game was triggered.

Alternate Embodiments

In various embodiments, system 100 awards prizes in money. In other embodiments, the prizes may be awarded in the form of points, internet time, gaming play credits or products. In alternate embodiments, the award of prizes may be carried out by a cashless implementation or directly to the game terminals 140, 170. For example, if a player wins a prize, the game terminal of that player may receive a monetary credit or the player's account may increase by the prize amount. Moreover, in various embodiments, transactions associated with prize awards may be stored in database 110 for later reference.

In the embodiments described herein, the games played on the game terminal 140, 170 and the secondary game are in the form of an electronic slot machine with reels. In alternate embodiments, the games played may include bingo, lottery, Keno or poker. In various embodiments, the game terminal may have a plurality of games that a player may choose from when the player logs into the terminal.

What is claimed is:

1. A computer-implemented method of allowing a user to play an electronic game on a terminal, said method comprising:

a. receiving a request from a player to play a game at a terminal;

b. at least partially in response to receiving the request, facilitating play of the game at the terminal;

c. at least partially in response to receiving the request from the player, establishing a bonus time period for the player;

d. receiving an indication that play of a second game occurs at a particular point in time;

e. determining if the bonus time period runs coincident with the particular point in time;

f. determining, while the player is playing the first game, whether play of the second game results in a prize; and g. if play of the second game results in a prize and the bonus time period runs coincident with the particular point in time, awarding at least a portion of the prize to the player, wherein once the second game is triggered to play, a server conducts all play of the second game without input from the player until play of the second game is terminated.

2. The computer-implemented method of claim 1, further comprising at least partially in response to receiving the request from the player, triggering play of the second game.

3. The computer-implemented method of claim 2, further comprising at least partially in response to triggering of the second game:

a. capturing an image of a display associated with the player if the bonus time period runs coincident with the particular point in time; and b. storing the image on the terminal.

4. The computer-implemented method of claim 1, further comprising notifying the player of the award of the at least a portion of the prize.

5. The computer-implemented method of claim 1, further comprising decrementing the bonus time period for the player.

6. The computer-implemented method of claim 5, further comprising incrementing the bonus time period for the player when additional requests are received from the player to play the game at the terminal.

7. The computer-implemented method of claim 1, further comprising receiving requests from a plurality of players to play a game.

8. The computer-implemented method of claim 7, further comprising at least partially in response to receiving the requests from the plurality of players, establishing a bonus time period for at least one or more of the plurality of players.

9. The computer-implemented method of claim 8, further comprising determining if the bonus time periods associated with the one or more of the plurality of players runs coincident with the particular point in time.

10. The computer-implemented method of claim 9, further comprising awarding at least a portion of the prize to each of the one or more of the plurality of players who have a bonus time period that runs coincident with the particular point in time.

11. A computer-implemented method of playing a sweepstakes game, the method comprising:

a. receiving, from a plurality of players, a plurality of requests to play a sweepstakes game;

b. at least partially in response to receiving the plurality of requests to play the sweepstakes game, facilitating play of the sweepstakes game for each of the plurality of players making a request by selecting an electronic sweepstakes draw from a fixed number of electronic sweepstakes draws associated with the sweepstakes game for each one of the respective plurality of requests;

c. at least partially in response to receiving the plurality of requests, awarding a bonus time period to each one of the plurality of players if the request for each of the plurality of players satisfies a first criterion;

d. receiving an indication that a play of a second sweepstakes game occurs at a particular point in time, wherein i. play of the second sweepstakes game comprises selecting at least one electronic sweepstakes draw from a fixed number of electronic sweepstakes draws associated with the second sweepstakes game, and ii. wherein the at least one sweepstakes draw may result in a nonzero prize;

e. determining, for each one of the plurality of players awarded the bonus time period, whether the bonus time period for the each one of the plurality of players is operative concurrent with the particular point in time; and f. awarding at least a portion of a prize that results from play of the second sweepstakes game to at least one of the each one of the plurality of players awarded the bonus time period that is operative concurrent with the particular point in time.

12. The computer-implemented method of claim 11, further comprising incrementing each awarded bonus time period by a fixed amount of time for each additional respective request from each one of the plurality of players to play the sweepstakes game.

13. The computer-implemented method of claim 11, further comprising resetting the bonus time period to a fixed amount of time for each additional respective request from each one of the plurality of players to play the sweepstakes game.

14. The computer-implemented method of claim 11, wherein the awarding at least a portion of the prize further comprises randomly selecting the at least one from the each one of the plurality of players awarded the bonus time period that is operative concurrent with the particular point in time.

15. The computer-implemented method of claim 11, wherein the first criterion further comprises receiving the request before a respective time counter for each of the plurality of players decrements to zero.

16. The computer-implemented method of claim 13, wherein the respective time counter for each of the plurality of players changes color as the respective time counter decrements to zero.

17. The computer-implemented method of claim 11, wherein the prize is a shared prize.

18. A computer system for playing games comprising a. at least one processor; and b. a plurality of terminals operatively coupled to the at least one processor;

wherein the at least one processor is configured to:

i. receive a request from at least one player to play a game on one of the plurality of terminals;

ii. at least partially in response to receiving the request from the at least one player, facilitate play of the game on the one of the plurality of terminals;

iii. at least partially in response to the request from the at least one player, establish a bonus time period for the at least one player;

iv. receive an indication that play of a secondary game has occurred at a particular point in time, and that play of the secondary game results in a prize;

v. determine whether play of the secondary game occurred during the bonus time period for the at least one player; and vi. at least partially in response to determining that play of the secondary game has occurred during the bonus time period for the at least one player, award at least a portion of the prize to the at least one player, wherein a sum of all prizes awarded in the secondary game may total an amount that is less than a total amount of a prize pool associated with the secondary game.

19. The computer system of claim 18, wherein the at least one processor is further configured to:

a. receive a request from a second player at another one of the plurality of terminals to play a second game;

b. at least partially in response to the request from the second player, facilitate a play of the second game on the another one of the plurality of terminals; and c. at least partially in response to the request from the second player, establish a second bonus time period for the second player.

20. The computer system of claim 19, wherein the at least one processor is further configured to:

a. determine whether the play of the secondary game occurs during the second bonus time period; and b. at least partially in response to determining that play of the secondary game occurs during the second bonus time period, award at least a portion of the prize to the second player.

21. The computer system of claim 19, wherein the at least one processor is further configured to increment the bonus time period by a fixed amount of time for each additional request received from the at least one player.

22. The computer system of claim 19, wherein establishing the bonus time period further comprises determining whether the at least one player submits the request within a predetermined amount of time.

* * * * *

UNITED STATES PATENT AND TRADEMARK OFFICE
Certificate

Patent No. 8,545,317 B2 | Patented: October 1, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bob Mosley, Piedmont, SC (US); Troy Jungmann, Austin, TX (US); and Robert Weatherby, Celina, TX (US).

Signed and Sealed this Eleventh Day of November 2014.

DMITRY SUHOL
*Supervisory Patent Examiner*
Art Unit 3716
Technology Center 3700